Oct. 2, 1945.　　　J. F. O'BRIEN　　　2,385,839
ELECTRICAL CONDUCTOR UNIT ASSEMBLIES
Filed April 26, 1941　　2 Sheets-Sheet 1
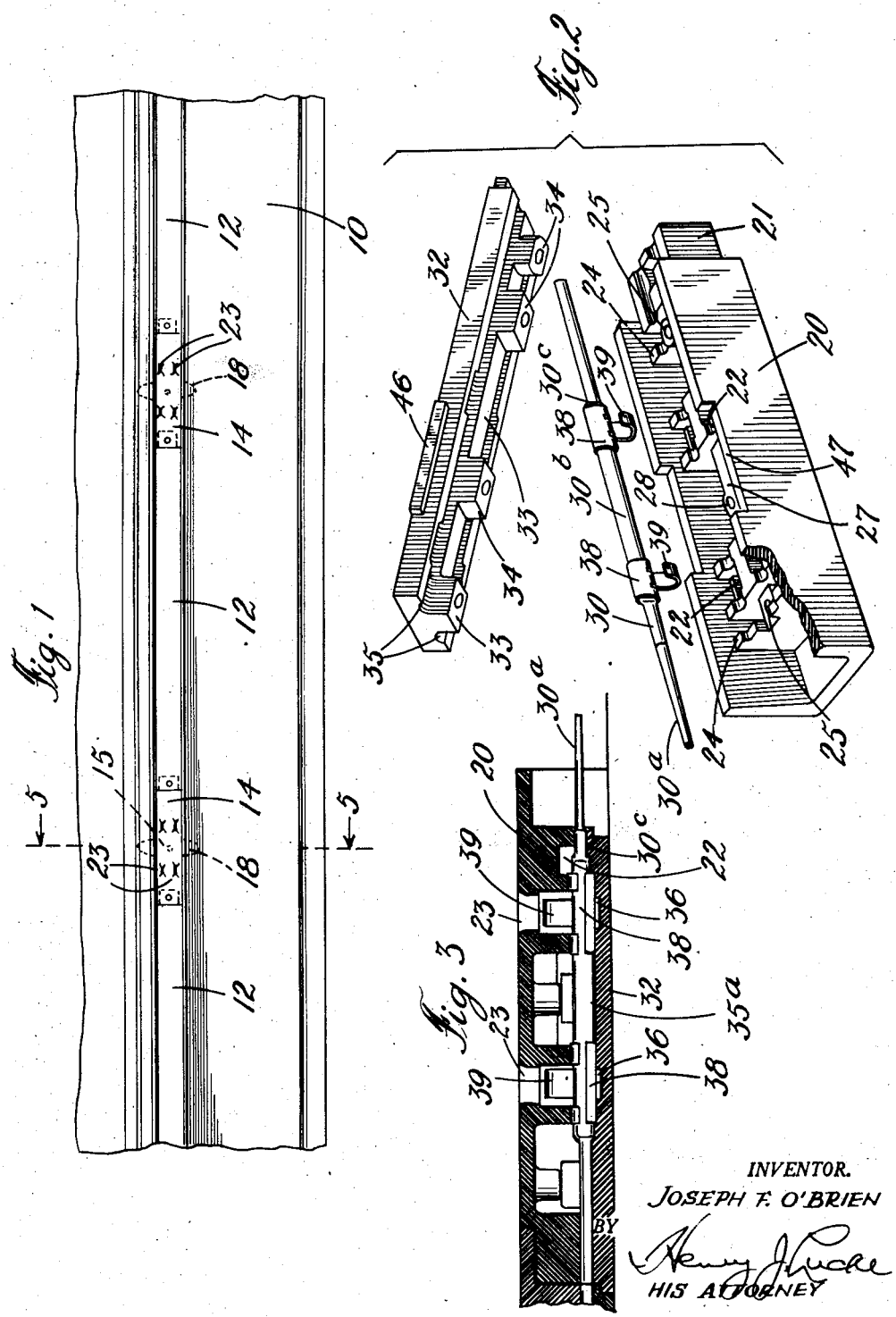
INVENTOR.
JOSEPH F. O'BRIEN
BY
HIS ATTORNEY

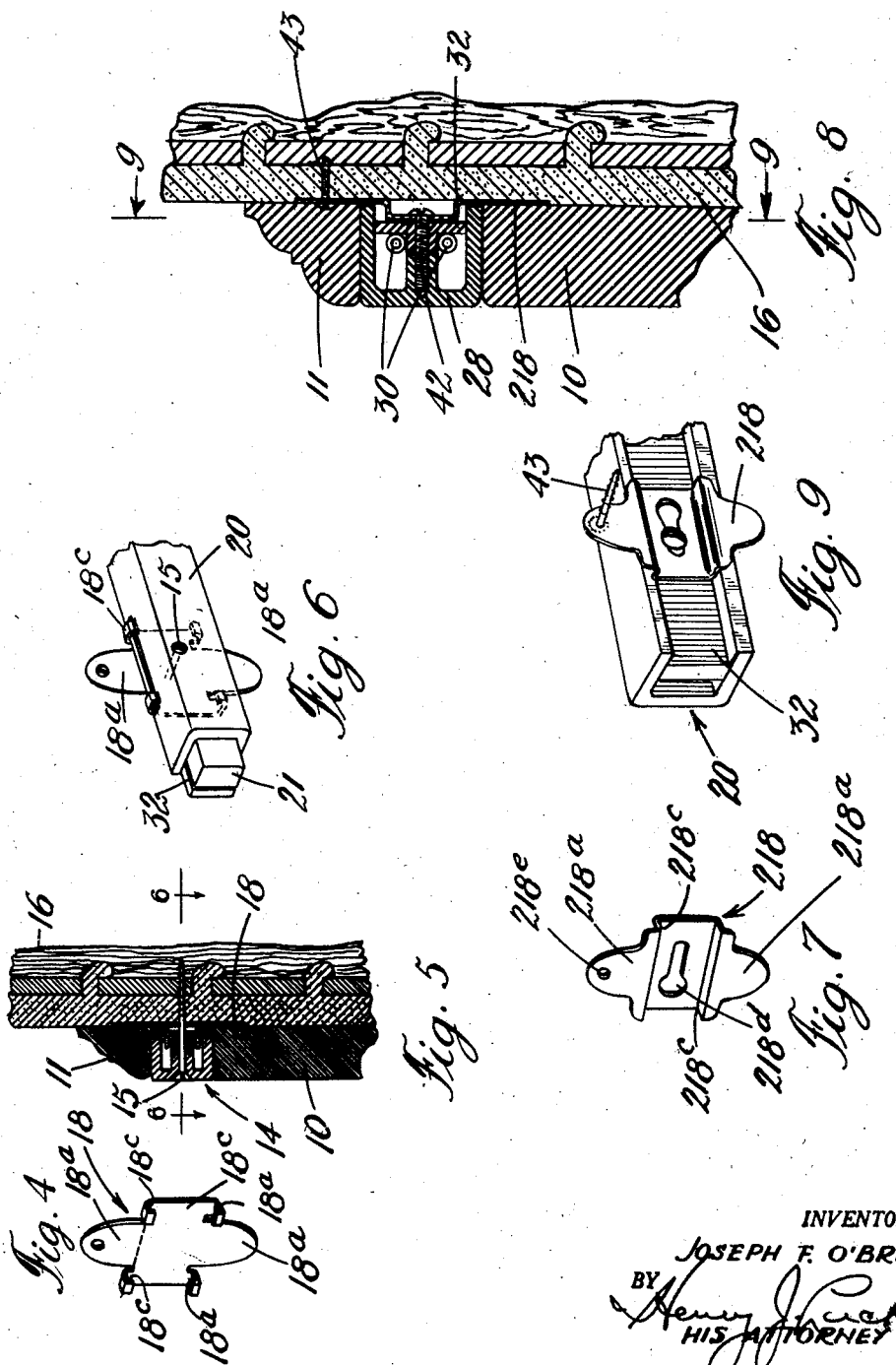

Patented Oct. 2, 1945

2,385,839

UNITED STATES PATENT OFFICE 2,385,839

ELECTRICAL CONDUCTOR UNIT ASSEMBLY

Joseph F. O'Brien, Jersey City, N. J., assignor to John B. Pierce Foundation, New York, N. Y., a corporation of New York Application April 26, 1941, Serial No. 390,454

3 Claims. (Cl. 173—334.1)

This invention relates to conductor unit assemblies for electric wiring systems.

In particular, the invention relates to an improved conductor unit for an electric wiring system embodying a series of interconnected conductor units, wherein any required plurality of conductor units are adapted for seriatim electrical and mechanical interconnection at exposed locations, such as at the baseboard of a room or the like, affording optimum facilities for outlet means, extension of the electrical circuit, and other advantages.

An object of the invention is to provide an electricity conductor unit wherein electricity conductors thereof are adapted for frictional connection with conductors of an adjacent unit, said electricity conductors being formed with flattened portions intermediate the ends to engage wall portions of the body of the unit to prevent longitudinal or rotative shifting of said conductors during the stage of frictional interconnection with the conductors of an adjacent unit.

An object of the invention is to provide an electricity conductor unit having improved means for the securement thereof to the baseboard or other structural trim of a room in which the seriatim connected units are employed.

The conductor unit may comprise a hollow, three-sided, body of electrical insulation material having transversely extending bridge members formed with aligned grooves arranged to receive and support, in mutually insulated status, a plurality of electricity conductors.

A particular feature of the invention resides in an electrical conductor unit comprising a hollow body serving as the cap member and a base or closure member removably secured thereto, and means for securing such conductor unit to a wall surface, such securing means cooperating with a lug carried by the closure member and preferably disposed within an elongated slot in a side wall of the cap member, such securing means being provided with gripping fingers and engaged by said lug, such securing means being provided with wings or extensions arranged to be secured to the surface of a wall or other support.

Other features and advantages will hereinafter appear.

In the accompanying drawings:

Fig. 1 is an elevation of a system of seriatim interconnected units according to the present invention, positioned at the baseboard of a room;

Fig. 2 is an exploded perspective of an outlet-provided conductor unit according to the present invention;

Fig. 3 is a central longitudinal sectional elevation of such outlet-provided unit;

Fig. 4 is a perspective of an attachment clip as employed with the outlet-provided unit of Fig. 2;

Fig. 5 is a detail sectional elevation on line 5—5 of Fig. 1;

Fig. 6 is a perspective view as appears on line 6—6 of Fig. 5;

Fig. 7 is a perspective view of another form of attachment clip;

Fig. 8 is an elevation, in section, corresponding generally to that of Fig. 5, but employing the attachment clip shown in Fig. 7; and Fig. 9 is a perspective view as appears on line 9—9 of Fig. 8.

In the drawings, Figure 1 shows electric wiring systems in which units incorporating features of the present invention are run at the top of a baseboard 10, and surmounted by a decorative molding strip 11. Baseboard material is generally of the order of seven-eighths (⅞) finished thickness, and hence the electric wiring units are preferably of equal or less overall depth, so that the faces of the units will be substantially flush with the surface of the baseboard, as appears in Figures 5 and 8. According to the present invention, the facial surface of the units is smooth, rendering the units inconspicuous in their installation, and to accommodate the blades of a standard attachment plug without thickening the outer wall surface of the units, the conductors within the units are closely spaced, to permit such attachment plug blades to lie at the side of the conductors. A wall of electrical insulation material effectuates such compact arrangement of the electricity conductors within the unit without the necessity of individually insulating said conductors, and without danger of electrical short circuit or electrical leakage.

In Figure 1, the electric wiring system comprises alternately assembled electricity conductor units, respectively designated 12, 14; the units 12 are devoid of electric outlet means. The overall length of such unit 12 may be of the order of twelve (12) inches, and the overall length of the units 14, said units incorporating one or more sets of contacts for the reception of an electric attachment plug, may be of the order of four (4) inches. Bearing in mind that conventional studding in a building is placed sixteen (16) inches on centers, it is obvious that from the center of one unit 14 to the center of the next succeeding unit 14 will be sixteen (16) inches, making it possible to secure a run of units firmly to the building structure by passing a wood screw or like fastening device 15, see Fig. 5, through a suitable aperture provided in unit 14 for pentration into a stud 16. As clearly appears from Fig. 1, the units 12 and 14 have a male and female end configuration so that the male portion of a unit 12 fits into a socket at one end of a unit 14, and a male portion of a unit 14 likewise fits into a socket in a unit 12. Provision is made for mechanically interconnecting the succession of units 12, 14, to integrate the seriatim interconnected units into an articulated whole.

In Figure 1 type of wiring system, supplemental securing means are provided, said securing means comprising clips or fastening devices 18, Fig. 4 or 218, Fig. 7 to provide for possible irregularity of spacing of studding or other unconventional construction whereby the normal screw-method of securing a sixteen (16) inch unit to unit conduit system may be impracticable.

Referring now to the units of the Fig. 1 system, the outlet-provided unit 14 may advantageously be formed of a molded plastic material having suitable electrical insulating properties. A unit 14, see Fig. 2, may include a three-sided substantially hollow body 20, at one end of which is an extension 21, the plane of the outer walls of such extension 21 being a continuation of the plane of the inner walls of the body 20. Said body 20 is formed with a plurality of transverse insulating walls, preferably integral to increase the structural strength of the unit; the intermediate pairs of insulating walls 22, 22 form pockets communicating with which are paired apertures 23 affording ingress of the blades of an electric attachment plug, to the interior of the body of the unit.

A transverse wall 24, see Fig. 2, may have a tapped hole 25; a transverse wall 26 is desirably positioned internally of said body 20 to an extent equal to the extent of projection of the member 21.

A central rib 27 has an aperture 28 therethrough, to provide for the passage of a wood screw.

As clearly appears from Fig. 6, each of the respective transverse walls, and additionally, the bottom surface of the projection 21 has a suitable channel, each channel being in alignment with a corresponding adjacent channel, and said channels collectively forming a cradle within which an electricity conductor 30, see Fig. 6, may be supported.

The closure member 32 for said hollow body is likewise desirably formed of electrical insulation material.

Such closure member is adapted to fit internally of the body 20, and is characterized by a central longitudinally extending rib 33, formed with any suitable plurality of bosses 34. A further characteristic of such closure member is the channels 35, 35 which lie at the base of the rib 34 at each side thereof and register with the stated groove formations in the transverse walls of the body 20. It will be noted from Figure 3 that the central portions 35a of the channels 35, 35, are deeper than the remaining portion of the channels 35, such depressed channel portions accommodating shouldered portions of the conductors 30, as presently described. Additionally, such closure member 32 may be formed with a plurality of pairs of pockets 36 which, when the closure member is in operative position, are disposed at the base of the insulated housings defined by the paired walls 22 of the body 20.

Referring to Figures 2 and 3, the electricity conductors 30 are preferably tubular, each having an end 30a swaged to form a taper, and a central portion 30b flattened to provide shoulders 30c, 30c. Suitably mounted on such conductors 30 and brazed or otherwise secured thereto at the ends of the flattened portions 30b are a plurality of electric contact means 38. The disposition of such contact means 38 on the conductor 30 positions the blade portions 39 thereof within the pockets formed by the walls 22, 22 of the body 20.

The swaging of end 30a into tapered formation affords means whereby such tapered end may be inserted into the open end of a tubular conductor of an adjacent unit for electrical interconnection therewith. By swaging or equivalent means, the taper is effected without reducing the metal content of the wall of the conductor.

As appears in Figure 3, the shoulders 30c, 30c of each conductor 30 are positioned adjacent each terminus of the depressed central portion 35a of the channels 35. The abutment of such shoulders 30c against the side walls provided by the portions 35a of the channel 35 restrains such conductors 30 against lateral displacement within the body 20.

For securing the outlet provided unit to the wall of the building, it is preferred to employ means supplementary to the screw 15, such as the clip 18, see Figure 4, of which projecting wing portions 18a, 18a may be positioned behind the baseboard 10 and the molding 11. To secure the clip 18 to a unit, the closure member 32 may be provided with suitable lugs 46, see Figures 2 and 3, for registry with depressions 47 provided in the body 20. The length of the lugs 46 and the depressions 47 is desirably equal; the depth of the lugs 46 bears such relation to the depth of the bosses 34, however, that when said bosses 34 abut against the rib means of the housing there is a slight clearance between the surface of the lug 46 and the surface of the depression 47 to permit the gripping fingers 18b of the clip to enter, as shown in Figures 5 and 6. It will be seen, therefore, that in assembling the unit the clip 18 is slid over the lugs 46 of the closure member 32 and then the closure member 32 may be placed in position with the body 20 and suitably secured. Desirably the width of the clip 18 allows for a suitable adjustment of the clip along the lugs 46 so that such clip may be brought into registry with the opening in the body member through which the screw 15 is passed. The employment of the clip 18 is advantageous when irregular wall studding or other condition makes it impossible to pass the screw 15 into a stud. The clip 18, having wings 18a of substantial area positioned behind the baseboard and molding strip respectively, will firmly secure the unit to the wall. In wood-lathed wall construction, the screw 15 may penetrate one of the laths, thereby additionally securing the unit.

Figures 7, 8 and 9 illustrate an attachment clip 218 comprising mutually facing horizontal surfaces 218c, 218c, corresponding to the horizontal surfaces of the gripping fingers of the attachment clip 18, and also wings 218a, 218a, corresponding to the wings 18a, 18a, of the attachment clip 18. The keyhole opening 218d affords means whereby the attachment clip 218 may be secured to the head of the screw such as the screw 42 for securing the closure member 32 to the cap member 20, as shown in Figures 8 and 9, whereby upon tightening the screw 42, the attachment clip 218 is secured to the unit assembly. A screw 43 may then be inserted through the opening 218e of the wing of the attachment clip 218 for securing the attachment clip and therewith the unit assembly 20, 32, to a wall of the building or other suitable support.

Whereas I have described my invention by reference to specific forms thereof, it will be understood that many changes and modifications may be made without departing from the spirit of the invention.

I claim:

1. An electricity conductor unit comprising the combination with a hollow body comprising a cap member and a base member removably secured thereto, said cap member having an elongate depression in a side wall thereof and said base member having a lug insertable into said depression and cooperating therewith to provide a relatively narrow long slot in said side wall, of means for securing said conductor unit to a wall surface, said means including a finger portion extending over said side wall and into said slot for laterally adjustable securement to said body and wing portions for attachment to such wall surface.

2. An electricity conductor unit comprising the combination with a hollow body comprising a cap member and a base member removably secured thereto, said cap member having spaced side walls provided with elongate depressions and said base member having lugs insertable into said depressions and cooperating therewith to provide relatively narrow long slots in said side walls, of means for securing said conductor unit to a wall surface, said means including an attachment clip having finger portions extending over said side walls and into said slots for laterally adjustable securement to said body, and wing portions for attachment to said wall surface.

3. An electricity conductor unit comprising the combination with a hollow body comprising a cap member and a base member removably secured thereto, said cap member having spaced side walls provided with elongate depressions and said base member having lugs insertable into said depressions and cooperating therewith to provide relatively narrow long slots in said side walls; of means for securing said conductor unit to a wall surface, said means including an attachment clip having opposite finger portions arranged in pairs and located at the sides of the clip and extending over said side walls and into said slots for laterally adjustable securement to said body, and wing portions for attachment to said wall surface.

JOSEPH F. O'BRIEN.